March 6, 1951 H. H. VANDERZEE 2,544,194
TOOTHED DRIVE FOR TRANSMITTING POWER
Filed Dec. 27, 1945 2 Sheets-Sheet 1
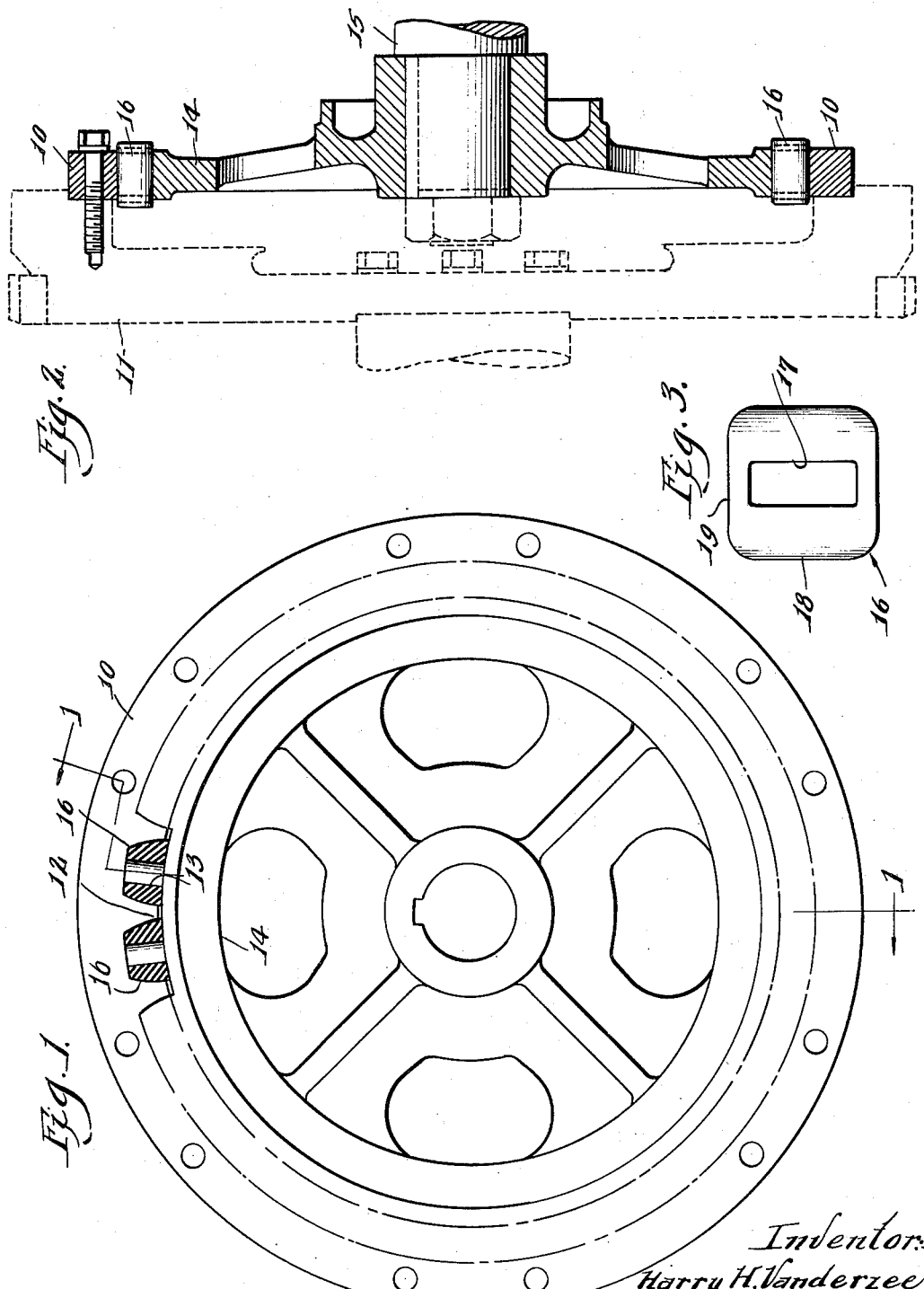
Inventor:
Harry H. Vanderzee
By, John W. Darley
Attorney March 6, 1951  H. H. VANDERZEE  2,544,194
TOOTHED DRIVE FOR TRANSMITTING POWER
Filed Dec. 27, 1945  2 Sheets-Sheet 2
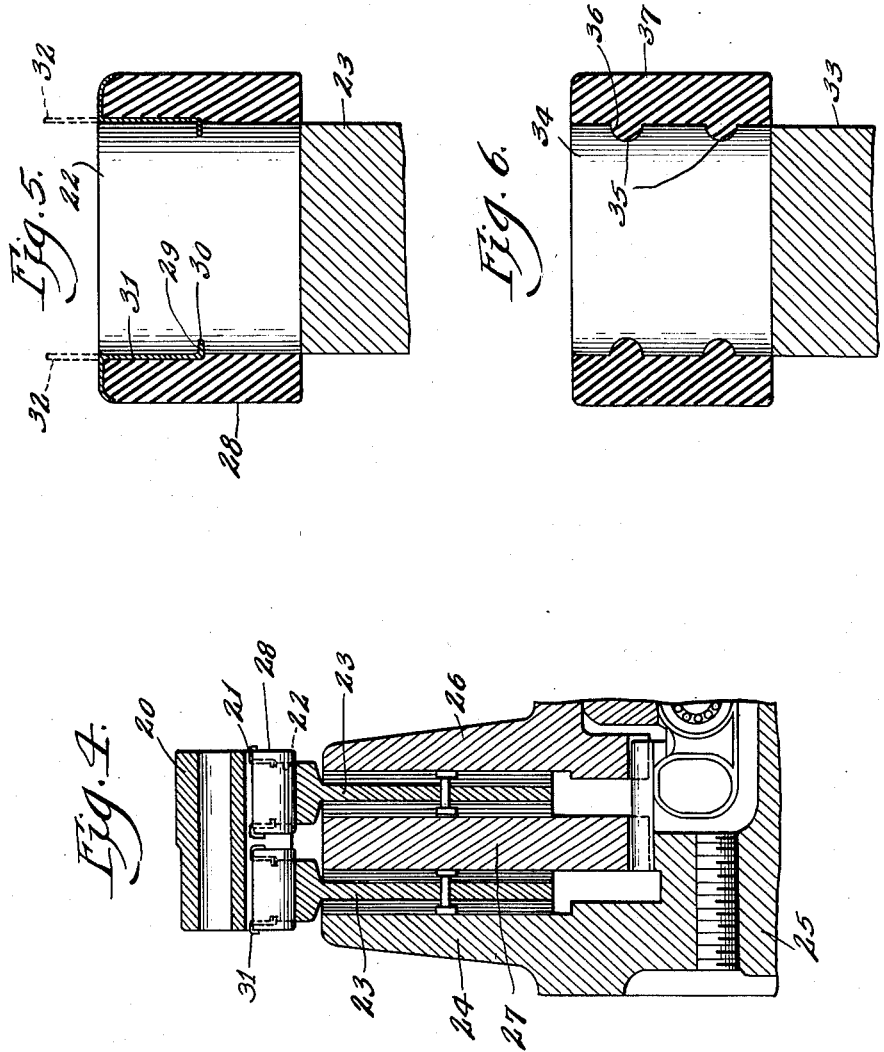

Patented Mar. 6, 1951

2,544,194

UNITED STATES PATENT OFFICE 2,544,194

TOOTHED DRIVE FOR TRANSMITTING POWER

Harry H. Vanderzee, Racine, Wis., assignor to Twin Disc Clutch Company, Racine, Wis., a corporation of Wisconsin Application December 27, 1945, Serial No. 637,445

2 Claims. (Cl. 64—9)

My invention relates to a toothed drive for transmitting power and more particularly to that type of drive in which all of the teeth of the cooperating members are in constant mesh and in which provision is made for cushioning the drive between the parts connected by the toothed members.

One object of the invention is to provide a toothed drive in which a portion of the drive compensates for misalignment of the connected parts and serves to absorb shocks and torsional vibrations that might otherwise be transmitted to the driven part.

A further object is to provide a toothed drive of the character indicated in which cushion elements are interposed between the working faces of the teeth on the cooperating members.

A further object is to devise a cushioned, toothed drive wherein the cushion elements are carried by one of the members with each element encasing a tooth.

A further object is to provide a toothed, rotary drive capable of application to axially aligned parts that are held against relative, axial movement, as in a driving spider or disk connection between a flywheel and a shaft, and also to axially aligned parts that are arranged for relative axial movement, as in the driving plates of a clutch whose peripheries are toothed for engagement with a driving ring.

A further object is to provide simple means for holding the cushion elements in position against the action of centrifugal force and which means are arranged to facilitate the easy and quick removal of the elements when replacement becomes necessary.

These and further objects of the invention will be set forth in the following specification, reference being had to the accompanying drawings, and the novel means by which said objects are effectuated will be definitely pointed out in the claims.

In the drawings:

Fig. 1 is an elevation of a typical, driving spider, partly in section, which embodies one application of the invention, only a few of the teeth being shown.

Fig. 2 is a section along the line 1—1 in Fig. 1.

Fig. 3 is a plan view of one of the cushion elements.

Fig. 4 is a fragmentary, sectional elevation of a friction clutch embodying the invention.

Fig. 5 is an enlarged, sectional elevation of one of the driving plate teeth in Fig. 4 showing the means for retaining the cushion element against the loosening action of centrifugal force.

Fig. 6 is a sectional view showing a modification of the cushion element retaining means.

Referring to Figs. 1 to 3, inclusive the numeral 10 designates a driving ring which may be secured to a driving member, such as a flywheel 11 shown dotted in Fig. 2, and which is provided around its inner periphery with teeth 12 that are disposed in cooperating relation to teeth 13 formed around the periphery of a driving spider 14 that is keyed to a driven shaft 15.

The flanks of each tooth 13 are preferably flat and encasing the flanks and end faces of each tooth is a rubber sleeve 16 through whose aperture 17 the tooth extends. In plan view, the sleeve 16 is generally quadrilateral in shape and the portions 18 which abut the tooth flanks are appropriately thickened to provide the required cushioning and accommodate the expected wear. The connecting portions 19 are somewhat narrower in section and the width of the aperture 17 is somewhat less than the thickness of the associated tooth. Hence, when the sleeve is positioned on a tooth, the portions 19 are stretched and the sleeve frictionally grips the tooth. This feature is important from the standpoint of facilitating assembly and preventing loss of the sleeves during this period as, normally, the spider 14 would be mounted on a fixture to receive the sleeves one at a time. The friction grip insures that when once stretched on a tooth, the sleeve will remain in position until the spider is mounted in its final assembly.

The working faces of the sleeve 16 may be curved or otherwise shaped to conform to the working faces of the cooperating teeth on the ring 10 and each portion 18 substantially fills the space between the flanks of an adjacent pair of teeth on the ring 10 and spider 14. Hence, the full driving torque of the ring is exerted through the sleeves, thus providing a cushioned, silent drive and one that compensates for any reasonable, axial misalignment between the ring 10 and the shaft 15.

In Fig. 4 is illustrated an application of the invention to a friction clutch whose driving plates have toothed driving connection with a driving ring. In adapting the invention to this structure, it is important to provide positive means for retaining the sleeves in position on the teeth against the loosening effect of centrifugal force which would jam the sleeves against the driving ring and interfere with the releasing movement of the driving plates. This condition is not critical in the arrangement shown in Fig. 2 since the ring 10 and spider 14 always maintain their relative positions.

Specifically, the numeral 20 designates a driving ring which may be bolted to a flywheel or other driving member (not shown) and which is provided with internal teeth 21 that constantly mesh with teeth 22—22 formed on the peripheries of a pair of spaced driving plates 23—23, each of which has secured to its opposite sides the usual annuli of friction material. Drive through the clutch is established by clamping the driving plates 23 against an abutment 24 forming part of a hub 25 that is secured to a driven shaft (not shown), the clamping being effected by a suitably operated, pressure plate 26 having a toothed, sliding connection with the hub and with an intermediate plate 27, also having a toothed sliding connection with the hub, interposed between the driving plates 23. This arrangement constitutes a characteristic clutch construction which may have one or more driving plates 23 and in and of itself forms no part of the invention, except to the extent presently mentioned.

Each of the teeth 22 carries a rubber sleeve 28 which is positioned relative thereto and to a tooth 21 as discussed in connection with Fig. 1 and achieves the same purposes. To retain the sleeves against centrifugal movement, the end faces of each tooth 22 are recessed at 29 and received in each recess is the bent end 30 of a strip 31 which extends outwardly along the adjacent end face and, before the sleeve 28 is stretched over the tooth, beyond the periphery of the tooth, as shown dotted at 32 in Fig. 5. With the strips 31 in the initial positions on a tooth, a sleeve 28 is stretched to enclose the flanks and ends of the tooth, including the strips, after which the strip ends 32 are bent laterally to retainingly bear against those portions of the sleeve which abut the end faces of the tooth. This construction effectively holds the sleeves in the desired operative position with respect to the teeth, while enabling the plates 23 to slide freely relative to the ring 20.

In Fig. 6 is shown a modified method of lockingly holding the rubber sleeves on the teeth. The numeral 33 designates a clutch driving plate, comparable to the plate 23, having teeth 34 disposed around the periphery thereof. Each end face of a tooth is provided with one or more recesses 35 in which are seated one or more bosses or ribs 36 that are molded integrally with a rubber sleeve 37. In positioning a sleeve, it is stretched sufficiently so that the bosses clear the tooth end faces and is then slipped along the tooth to grippingly seat the bosses in the recesses.

In addition to the advantages already noted, the construction enables the teeth to be cut on a standard gear cutting machine which simplifies manufacture. The flexible nature of the rubber sleeves obviates any necessity for forming the teeth with that degree of accuracy required when the teeth have meshing contact. Further, it is contemplated that the rubber sleeves may be carried by the internal teeth of an outer ring instead of by the external teeth of an inner cooperating ring.

I claim:

1. In toothed, rotary drive construction wherein power is transmitted between an outer member and an inner, coaxial member, each member having teeth extending into the spaces between the teeth of the other member, a rubber sleeve encircling each tooth on the inner member and providing a snug fit with the teeth on the other member, and means for holding the sleeves against movement due to centrifugal force comprising strips abutting the end faces of each tooth, the inner end of each strip being anchored in the tooth and the outer end bent to overlie a portion of the sleeve.

2. In toothed rotary drive construction wherein power is transmitted between an outer member and an inner, coaxial member, each member having teeth extending into the spaces between the teeth of the other member, a rubber sleeve encircling each tooth on the inner member and providing a snug fit with the teeth on the other member, and means for holding the sleeves against movement due to centrifugal force comprising strips abutting the end faces of each tooth, the inner end of each strip being hooked in a recess in the tooth and the outer end bent to overlie a portion of the sleeve.

HARRY H. VANDERZEE.

REFERENCES CITED

The following references are of record in the file of this patent:

UNITED STATES PATENTS

| Number | Name | Date |
|---|---|---|
| 301,246 | Leeson | July 1, 1884 |
| 2,259,460 | Dexter | Oct. 21, 1941 |
| 2,394,448 | Herold et al. | Feb. 5, 1946 |